(No Model.) 2 Sheets—Sheet 1.
C. H. NORTON.
MICROMETER FEED FOR GRINDING OR OTHER MACHINES.
No. 591,357. Patented Oct. 5, 1897.
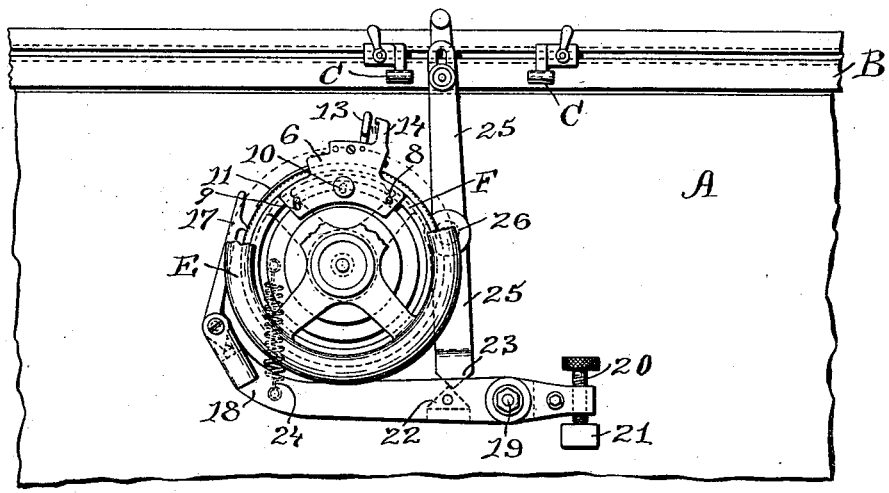
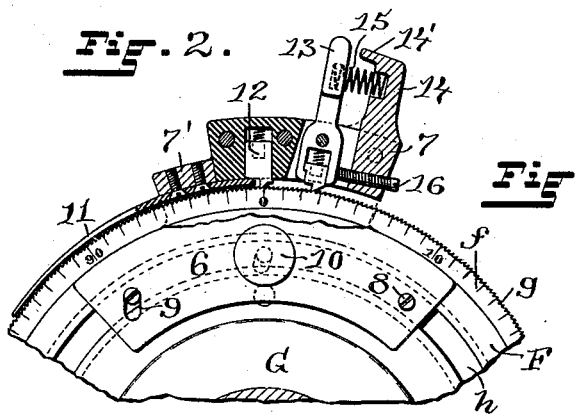
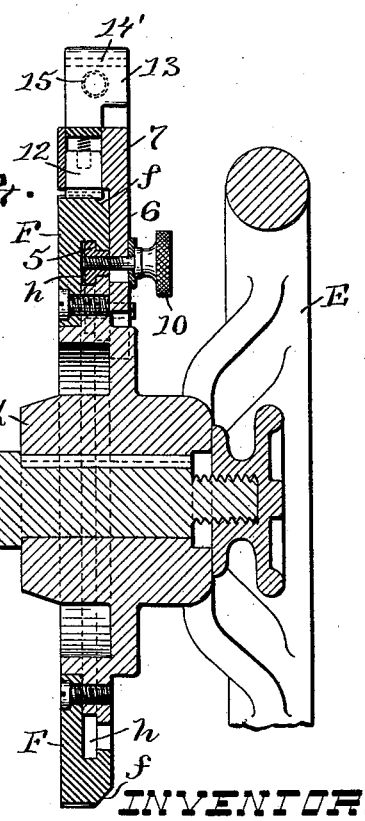
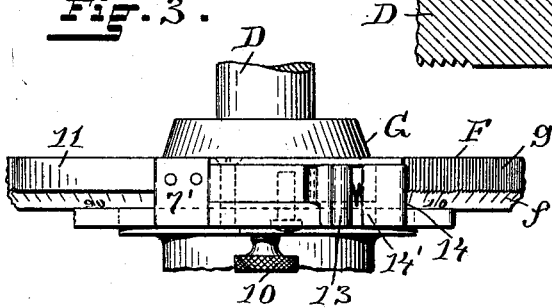
WITNESSES: M. F. Bligh. Chas. H. Luther Jr.
INVENTOR: Charles H. Norton, by Joseph A. Miller & Co., Attys.

(No Model.) 2 Sheets—Sheet 2.

C. H. NORTON.
MICROMETER FEED FOR GRINDING OR OTHER MACHINES.

No. 591,357. Patented Oct. 5, 1897.

WITNESSES: Chas. H. Luther Jr. B. M. Simms

INVENTOR: Charles H. Norton by Joseph A. Miller & Co. Attys

United States Patent Office.

CHARLES H. NORTON, OF PROVIDENCE, RHODE ISLAND, ASSIGNOR TO THE BROWN & SHARPE MANUFACTURING COMPANY, OF SAME PLACE.

MICROMETER-FEED FOR GRINDING OR OTHER MACHINES.

SPECIFICATION forming part of Letters Patent No. 591,357, dated October 5, 1897.

Application filed April 21, 1897. Serial No. 633,175. (No model.)

*To all whom it may concern:*

Be it known that I, CHARLES H. NORTON, of Providence, in the county of Providence and State of Rhode Island, have invented a new and useful Improvement in Micrometer-Feeds for Grinding or other Machines; and I hereby declare that the following is a full, clear, and exact description of the same, reference being had to the accompanying drawings, forming part of this specification.

This invention has reference to an improvement in the cross-feed mechanism by which the grinding-wheel is adjusted to the article to be ground.

The invention consists in the peculiar and novel construction of a disk secured to the feed-screw spindle, provided with a scale and ratchet-teeth indicating fractions, a shield adjustable by a pawl constructed to move the shield through a predetermined distance, and an automatically-operated pawl whereby the grinding or cutting tool is advanced, as will be more fully set forth hereinafter.

The invention is particularly designed for use on the cross-feed of grinding-machines, but is applicable to planing, shaping, turning, and other machines. I have elected to show and describe the same in connection with a grinding-machine.

In machines for grinding spindles, plugs, or cylindrical blanks, such as the blanks for twisted drills, great nicety of adjustment is required to successively grind off a predetermined amount and to adjust the machine for the final cut, so as to finish the article exactly to the standard measurement required. Standard plugs and drill-blanks require to be ground to within one ten-thousandth of an inch. To make the proper adjustment has heretofore required great skill and time.

The object of this invention is to secure the automatic adjustment for each successive step in cutting or grinding and a final adjustment for the finishing cut, that can be readily made by an ordinary attendant.

Figure 5:
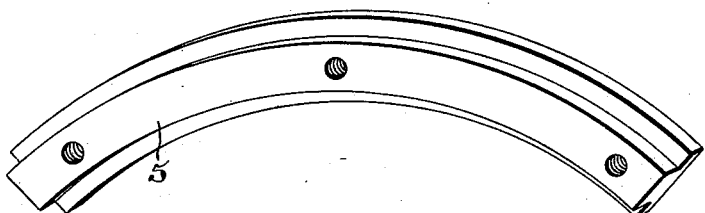
Figure 6:
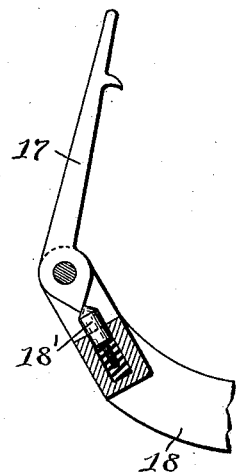

Figure 1 is a side view of part of the frame and the reciprocating carriage of a grinding-machine, showing the micrometer cross-feed, the hand-wheel of which is shown as partly cut away, so as to more clearly show the adjustable shield. Fig. 2 is a view, partly in section, of the micrometer-disk and the adjustable shield. Fig. 3 is a top view of the adjustable shield. Fig. 4 is a vertical sectional view through the center of the screw-spindle and micrometer-disk, showing the connection of the adjustable shield with the micrometer-disk. Fig. 5 is a perspective view of the segmental T-bar. Fig. 6 is a detail view, partly in section, of the end of the lever 18 and the pawl, showing the spring-pressed pin.

Similar letters and numerals of reference indicate corresponding parts in all the figures.

In the drawings, A indicates part of the frame of a grinding-machine; B, the reciprocating bed-plate on which the grinding-machine is supported; C C, the stops adjustably secured to the reciprocating bed-plate B to operate the automatic cross-feed mechanism; D, the screw-spindle by which the tool-support—in the present case, the support for the grinding-wheel and operative mechanism—is adjusted to the work; E, the hand-wheel for turning the screw-spindle D; F, a disk on the beveled edge of which a graduated scale is marked. The periphery of the disk F has the ratchet-teeth $g$. The distance from one ratchet-tooth to the other is a uniform fraction of the scale $f$, and, while it may be any predetermined distance, is, in the grinding-machine attachment as shown in the drawings, equal to one-fourth of one of the divisions on the scale $f$ and represents a movement of the support of the grinding mechanism connected with the screw-spindle D equal to one-fourth of one one-thousandth of an inch.

The disk F is shown in the drawings as a ring attached to a flange extending from the hub G. This construction facilitates the work of graduating and finishing the disk F, but I do not wish to limit myself to the exact construction shown. All that is required is that when in use the screw-spindle D, the disk F, and the hand-wheel E shall be so connected that they turn together as a whole. The disk F is provided with the annular undercut groove $h$ in which the segmental T-bar 5 slides. The side 6 of the segmental carriage 7 is pivotally secured near one end to the segmental bar 5 by the screw 8 and on the other end by a screw extending through the slotted opening 9, so that the carriage 7 and side 6 may be moved with the segmental bar 5 around the disk F close to the periphery of the same.

To secure the carriage in any desired position on the disk, the clamp-screw 10, extending through a slotted opening central between the ends of the side-piece 6 and in screw-threaded engagement with the segmental bar 5, is turned so as to clamp the side 6 to the segmental bar, as is shown in Fig. 4. To the end 7' of the carriage 7 is secured the curved shield 11. The sliding spring-pressed pawl 12 is placed into a cavity in the end 7' of the carriage 7, and near the other end of the carriage the lever 13 is pivotally secured. The lower end of this lever is provided with a spring-pressed pawl, and between the upper part of the lever 13 and the arm 14 of the carriage 7 is placed the coiled spring 15. The screw 16 forms an adjustable stop for the lower end of the lever 13, by which the movement of the pawl in the lower end of the lever 13 is limited, so that by moving the upper end of the lever 13 against the projecting end 14' of the arm 14 and allowing the coiled spring 15 to move the upper end of the lever 13 outward until the lower end of the lever is in contact with the end of the adjusting-screw 16 the carriage 7 and the shield 11 will be moved on the disk F through a predetermined fixed distance, which may be equal to one, two, or more of the ratchet-teeth $g$.

The screw-spindle D is operated through the disk F by a reciprocating pawl. In a grinding-machine the pawl 17 is provided with a suitable hook by which it rides over the ratchet-teeth $g$ when moving in one direction and engages with the ratchet-teeth when moving in the opposite direction. The pawl 17 is pivotally connected with the end of the lever 18 and is provided with a heel, against which a spring-pressed pin 18 bears to hold the hooked end in contact with the edge of the disk F in the manner usual with such devices. The lever 18 is pivotally connected with the stud 19, projecting from the frame A. The adjusting-screw 20 extends through the end of the lever 18 and bears on the stop 21, the cam-bearing 22 acts in connection with a lever or other cam 23 to depress the lever 18, and the coiled spring 24, one end of which is secured to the lever 18 and the other end to the frame A, acts to raise the end of the lever 18, to which the pawl 17 is secured, and depress the other end provided with the adjusting-screw 20 until the end of the screw bears on the stop 21. The lever 25 is pivoted on the fulcrum 26, the lower end forming the cam 23, and the upper end extends between the stops C C.

I will now, to enable others skilled in the art to use my improved micrometer-feed, describe the operation of the same in connection with a grinding-machine.

When a blank to be ground has been adjusted in the bearings in which it is supported and usually rotated, the operative turns the hand-wheel E until the grinding-wheel is in contact with the blank. The blank is now accurately measured, or it may have been previously measured, with a micrometer-gage. The exact diameter of the finished blank being known it is at once evident how much material has to be removed, for if the difference in the diameters is four one-thousandths of an inch one-half or two one-thousandths of the material will have to be removed. When the grinding-wheel is in contact with the blank, the pawl 17 engages with one of the ratchet-teeth on the disk F. The operative will now move the carriage 7 and with it the shield 11, so that the point of the shield is two one-thousandths on the scale $f$ from the ratchet-tooth on the face of the disk F with which the hook of the pawl 17 is engaged. With the lever 13 adjusted to move the carriage one tooth at a time, the end of the shield is placed against the hook of the pawl 17 and the lever compressed eight times to move the carriage a distance which is the equivalent of moving the grinding-tool two one-thousandths of an inch. The grinding-machine is now started, and at each reciprocation of the bed-plate B the pawl 17 rotates the disk F and screw-spindle D one, two, or more of the ratchet-teeth $g$, according as the screw 20 is adjusted, until the pawl rides on the shield 11. The blank is now accurately calipered, and owing to the wear on the grinding-wheel it is usually found that one or two one-thousandths of an inch more have to be ground off the blank. In this final adjustment the value of the pawl movement of the carriage is most conspicuous, for taking the lever 13 and arm 14 between the thumb and forefinger the operative presses them together and releases them once for each one-fourth of a thousandth of an inch or any other predetermined distance.

In practice I find that by the use of this micrometer-feed an operative will produce a much greater number of blanks during a given time with the same machine than can be produced when the ordinary cross-feed as heretofore constructed is used. Instead of depending on the sight in the adjustment of the grinder the operative depends on the sense of touch in the adjustment of the shield.

The carriage 7 and the shield 11, when they are required to be moved, may be raised off from the ratchet-teeth $g$ by first releasing the side 6, clamped by the thumb-screw 10, and then swinging the same on the pivot-screw 8 until the bottom of the slotted opening 9 is reached by the screw which passes through said opening.

Having thus described my invention, I claim as new and desire to secure by Letters Patent—

1. In a device for automatically controlling the operation of a cutting-tool, the combination with the screw-spindle connected with the tool-support and a reciprocating part of the machine, of a disk connected to and rotating with the screw-spindle, a micrometer-scale on the disk, ratchet-teeth on the edge of the disk, a carriage provided with a shield adjustably secured to the disk, and a pawl to which reciprocating motion is imparted from a moving part of the machine, said pawl engaging with the ratchet-teeth on the edge of the disk, whereby the operation of the cutting-tool is automatically controlled, as described.

2. In a cross-feed mechanism for grinding and similar machines, the combination with the frame of the machine and the bed supporting the cutting-tool, of the screw-spindle D, a hand-wheel on the screw-spindle, a graduated disk, having ratchet-teeth on its periphery, secured to and turning with the screw-spindle, a shield partially covering the periphery of the disk, a carriage sliding on the disk and supporting the shield, a spring-pressed lever pivotally supported in the carriage and in engagement with the peripheral ratchet-teeth on the disk, a pawl engaging with the peripheral ratchet-teeth on the disk, and mechanism for reciprocating the pawl whereby the tool is automatically fed up to the work, as described.

3. In an automatic micrometer device for controlling the cutting-tool, the combination with the screw-spindle, the disk secured to the screw-spindle, the peripheral ratchet-teeth on the disk, and the reciprocating pawl 17, of the carriage 7 provided with the shield 11, the spring-pressed pawl 12 and the lever 13, pivotally supported in the carriage, provided with a spring-pressed pawl at the lower end, and a spring interposed between a fixed part of the carriage and the lever 13, whereby the carriage and shield may be moved by the said lever through a predetermined distance, as described.

4. In a micrometer-feed-controlling device, the combination with the graduated disk, peripheral ratchet-teeth on the disk, and the carriage supporting the shield, of the lever 13, and the screw 16 forming an adjustable stop for the lever, whereby the movement of the lever is restricted, as described.

5. In a micrometer-feed-controlling device, the combination with the graduated disk F, the peripheral ratchet-teeth $g$, the undercut annular groove $h$, and the curved segmental bar 5, of the carriage 7 provided with pawls engaging with the peripheral ratchet-teeth, and the side 6 pivotally secured to the segmental bar 5 by the screw 8, whereby the carriage may be raised free off from the ratchet-teeth and adjusted, as described.

6. In a micrometer-feed for grinding and similar machines, the combination with the frame A, the bed-plate B, the stops C C, the screw-spindle D, the hand-wheel E, and the graduated disk F provided with the peripheral ratchet-teeth $g$, of the lever 25 provided with the cam 23, the lever 18 having the adjusting-screw 20 coöperating with the stop 21, the cam-surfaces 22, the coiled spring 24 secured at opposite ends to the lever and the frame, the pawl 17 connected with the lever 18 and engaging with the ratchet-teeth $g$, and the adjustable carriage 7 provided with the shield 11 whereby the progressive feed of the grinding-tool to the work is automatically controlled, as described.

In witness whereof I have hereunto set my hand.

CHARLES H. NORTON.

Witnesses:
JOSEPH A. MILLER,
JOSEPH A. MILLER, Jr.